Dec. 19, 1972  C. ARNE  3,706,627
STRESS ORIENTED CORRUGATIONS
Filed June 7, 1971  2 Sheets-Sheet 1

INVENTOR
CHRISTIAN ARNE
BY Merriam, Marshall, Shapiro & Klose
ATTORNEYS

INVENTOR
CHRISTIAN ARNE
BY
ATTORNEYS

United States Patent Office 3,706,627
Patented Dec. 19, 1972

3,706,627
STRESS ORIENTED CORRUGATIONS
Christian Arne, Chicago, Ill., assignor to Chicago Bridge & Iron Company, Oak Brook, Ill.
Filed June 7, 1971, Ser. No. 150,568
Int. Cl. B32b 1/00, 3/28
U.S. Cl. 161—131                                6 Claims

ABSTRACT OF THE DISCLOSURE

A sheet having a center section of alternating depending and extending frusto-conical elements and one-way corrugations extending away from said center section to the edges of the sheet.

---

This invention relates to an improvement in plane expandable corrugations of the type shown and disclosed in my U.S. Pat. No. 3,279,973.

In those instances where a number of plates, each having surfaces which employ the extending and depending conical expanding elements disclosed in my referenced patent, are joined, a problem arises due to the difficulty in welding together the conical shapes located at the sides and ends of corresponding plates. For example, when a number of plates having the frusto-conical structures such as shown in FIG. 13 of Pat. No. 3,279,973 are to be joined, the problem of welding the plates at the location of the plane expandable corrugations is quite difficult. It is desired to obviate this difficulty while at the same time provide plates having the advantages afforded by plane expandable corrugations.

When plates or sheets employing plane like corrugations at their edges are joined together, it has been noted that as the plates cool and shrink in a particular application, the plain or uncorrugated area of the plate feeds upon the plane expandable corrugations and from these corrugations, a plate draws the additional area it requires without unduly increasing the stress on a plate.

However, in this process, all four corners of the plate, as well as the midpoints of the sides and the midpoints of the ends of the plate remain stationary as each point on the flat part of the plate (see FIG. 13 of Pat. No. 3,279,973) slides on its support in the direction of the nearest corner. At the midpoints of the sides and the ends of each plate, the corrugations need expand in one direction only. Thus, any corrugations located at these midpoints need not be of the plane expandable type but rather the corrugations can be of the type which allows shrinkage or movement of the plate in one direction only. Accordingly, the invention disclosed and claimed herein relates to a plate or sheet utilizing plane expandable corrugations in the middle section whereas the midpoints employ one way corrugations.

Further objectives and advantages of the present invention will be apparent from the following descriptive references being had to the accompanying drawings, wherein.

Figure 1:
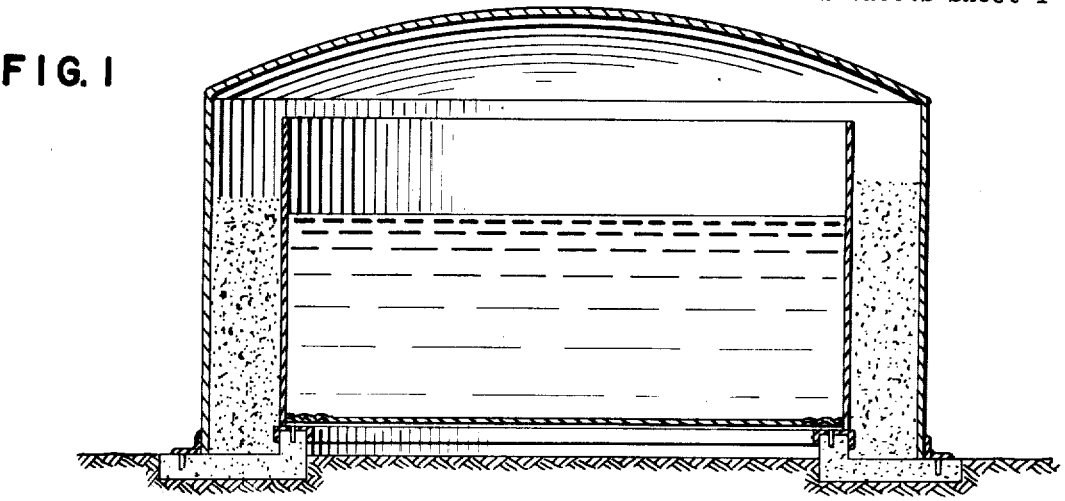
FIG. 1 is a fragmentary view of a number of plates, each employing the corrugations of the present invention, welded together.
Figure 2:
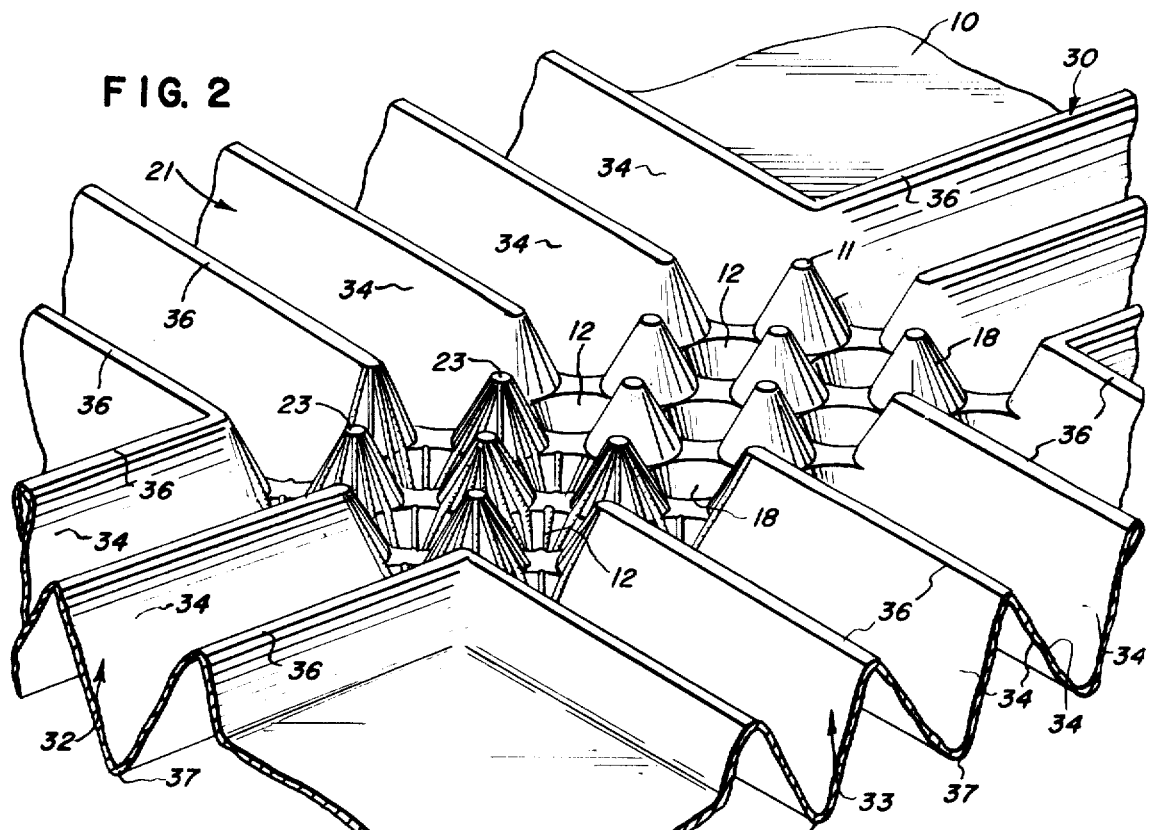
FIG. 2 is an enlarged fragmentary view of a plate of FIG. 1 showing the uni-directional and plane expandable corrugations.
Figure 7:
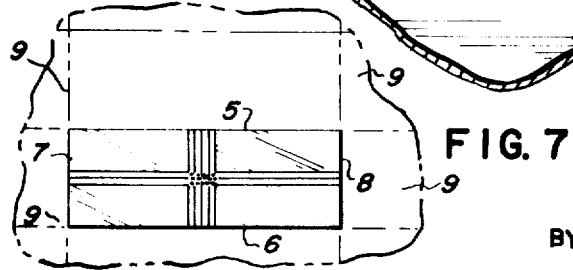

Referring to the drawings and particularly FIGS. 1 and 2, a plurality of plates or sheets 9 are welded together for the purpose of providing a bottom plate in a tank which will be subjected to temperature variations of such extent that the tank bottom will be subjected to contraction and expansion.

Plate 9 includes a flat surface or datum plane 10 with alternating extending 11 and depending 12 hollow frusto conical elements formed in the plate. The terms "extending" and "depending" refer to similar conical elements but on opposite sides of the plane.

The sidewalls 18 of the extending 11 and depending 12 frusto conical elements are common sidewalls 18 in which corrugations 21 (see FIG. 3) have been formed. The corrugations 21 of each extending 11 and depending 12 frusto conical element extend from the frustum 23 of the extending 11 or depending 12 frusto conical element, along the common sidewalls 18 to flat datum plane surface 10 where they merge with corrugations 21 extending along the adjacent extending 11 or depending 12 frusto conical element.

Extending from the plane expandable corrugations are sections of one-way corrugations 30, 31, 32, 33. Sections 30, 32 include corrugations which deform or extend laterally whereas sections 31, 33 deform or expand longitudinally. There are a greater plurality of one-way corrugations in sections 31 and 33 than in sections 30, 32 due to the fact that sections 31 and 33 must provide for movement along the length of the plate. Other type plates and patterns could be used if desired.

Each section includes a plurality of inclined side walls 34 with the top marginal edges of the side walls terminating as a marginal edge of a top wall 36. The bottom marginal edges of side walls 34 terminate as marginal edges of a bottom wall 37.

Figure 3:
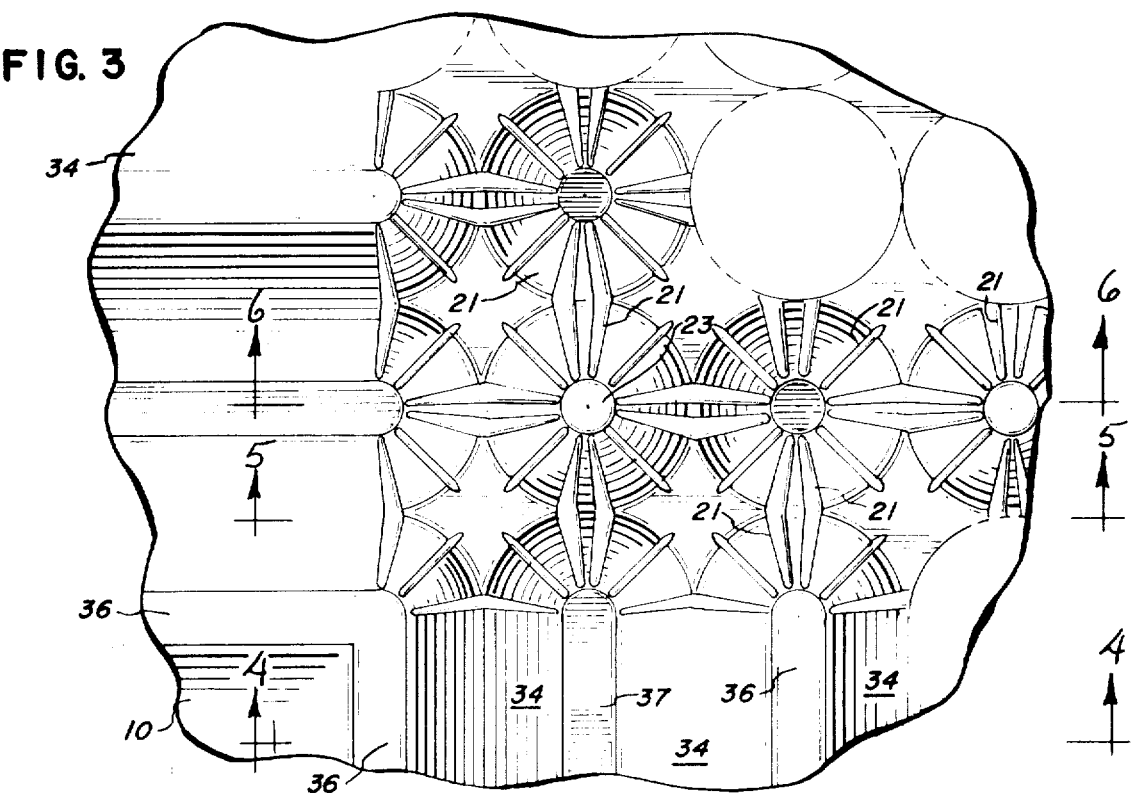
FIG. 3 is a fragmentary, plan view of the corrugations of FIG. 2 and further illustrates additional corrugations located in the walls of the extending and depending frusto-conical elements.
Figure 4:
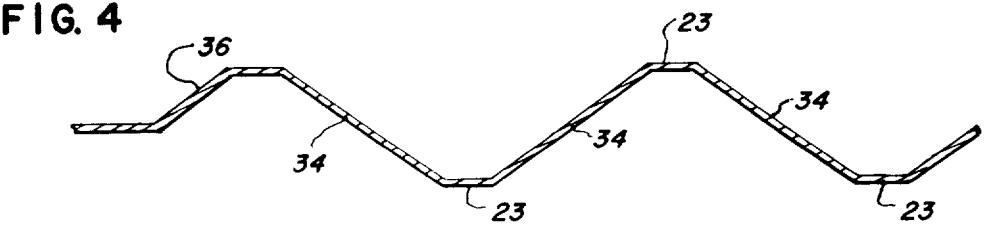
FIG. 4 is a side view of a plate of the present invention taken along lines 4—4 of FIG. 3.
Figure 5:
FIG. 5 is a side view of a plate of the present invention taken along lines 5—5 in FIG. 3; and, FIG. 6 is a side view of a plate of the present invention taken along lines 6—6 in FIG. 3.
Figure 6:
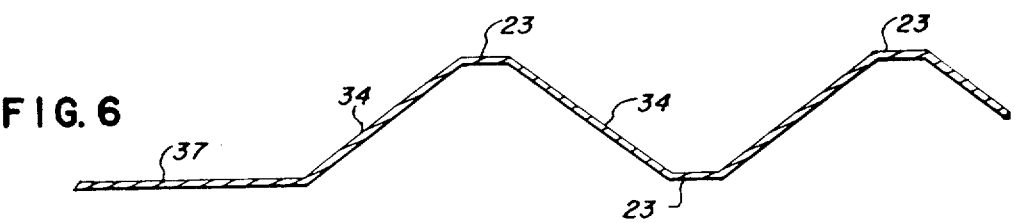

Sections 30, 32 extend from ends 7, 8 of plate 9 longitudinally inward where they mesh with the plane expandable corrugations as illustrated in FIGS. 2 and 3. Similarly, sections 31, 33 extend from the sides 5, 6 of plate 9 laterally inward where they mesh with the plane expandable corrugations as illustrated in FIGS. 2 and 3.

Corresponding plates, each employing the plane expandable corrugations and one-way corrugation sections as disclosed and claimed herein, can be welded together with each plate edge or end joined to an adjacent edge or end which travels in the same direction due to a temperature change.

The foregoing detailed description has been given for clearness of understanding only, no unnecessary limitations implied, as modifications will be obvious to those skilled in the art.

What is claimed is:
1. A plate comprising:
   a center section consisting of a plurality of hollow conical elements alternatively extending from and depending from a common datum plane;
   the adjacent extending and depending conical elements having common side walls and forming points of tangency at the datum plane; and,
   at least one, one-way corrugation section extending outwardly from said center section of said plate.

2. The plate of claim 1 wherein said one-way corrugation section comprises:
   a plurality of inclined spaced side walls;
   top walls whose marginal edges terminate as a top marginal edge as a side wall; and, bottom walls whose marginal edges terminate as a bottom marginal edge as a side wall.

3. A sheet having two sides and two ends, said sheet comprising:
- a center section consisting of a plurality of hollow conical elements alternatively extending from and depending from a common datum plane;
- the adjacent extending and depending conical elements having common side walls and forming points of tangency at the datum plane;
- one-way corrugation sections extending laterally from said center section to each side of said plate at the midpoints of said sides; and,
- one-way corrugation sections extending longitudinally from said center section to each of the ends of the plate at the midpoints of said ends.

4. The sheet of claim 3 wherein each of said one-way corrugation sections comprises:
- a plurality of inclined spaced side walls;
- top walls whose marginal edges terminate as a top marginal edge as a side wall; and,
- bottom walls whose marginal edges terminate as a bottom marginal edge as a side wall.

5. The sheet of claim 4 wherein the said one-way corrugation sections mesh with said plane expandable corrugations.

6. The sheet of claim 5 wherein said plate is rectangularly-shaped and the one-way corrugations extending laterally in said sheet are greater in number than those extending longitudinally in said sheet.

References Cited
UNITED STATES PATENTS

| 3,391,413 | 7/1968 | Crane et al. | 161—131 XR |
| 3,525,663 | 8/1970 | Hale | 161—131 XR |

WILLIAM A. POWELL, Primary Examiner

U.S. Cl. X.R.

161—133